United States Patent [19]

Abendschein et al.

[11] Patent Number: 4,738,506
[45] Date of Patent: Apr. 19, 1988

[54] FIBER OPTIC CABLE CONNECTOR WITH SNAP-ACTION SHUTTER

[75] Inventors: Frederic H. Abendschein, Columbia; Paul B. Derr, Middletown; Randy M. Manning, New Cumberland, all of Pa.

[73] Assignee: AMP Incorporated, Harrisburg, Pa.

[21] Appl. No.: 796,477

[22] Filed: Nov. 8, 1985

[51] Int. Cl.[4] .................................................. G02B 6/36
[52] U.S. Cl. ................................ 350/96.20; 350/96.21
[58] Field of Search ............... 350/96.20, 96.21, 96.22, 350/96.23; 250/227

[56] References Cited

U.S. PATENT DOCUMENTS

| 3,683,167 | 8/1972 | Rishton | 350/96.2 X |
| 4,223,217 | 9/1980 | Bongard et al. | 250/227 |
| 4,598,715 | 7/1986 | Mächler et al. | 350/96.2 X |
| 4,607,160 | 8/1986 | Sakakino | 250/227 |
| 4,607,161 | 8/1986 | Anderson et al. | 250/227 |

FOREIGN PATENT DOCUMENTS 2820433 11/1978 Fed. Rep. of Germany ..... 350/96.2

*Primary Examiner*—John Lee
*Assistant Examiner*—John Ngo

[57] ABSTRACT

Two optical fiber cables are joined by a connector operative as a switch. The switch includes a snap-action shutter which delivers precise movement with piece parts which can be molded or electromachined. The snap-action is provided by any one of a number of inexpensive implementations which need not be precise because of the constraints on shutter movement imposed by the piece parts.

9 Claims, 8 Drawing Sheets

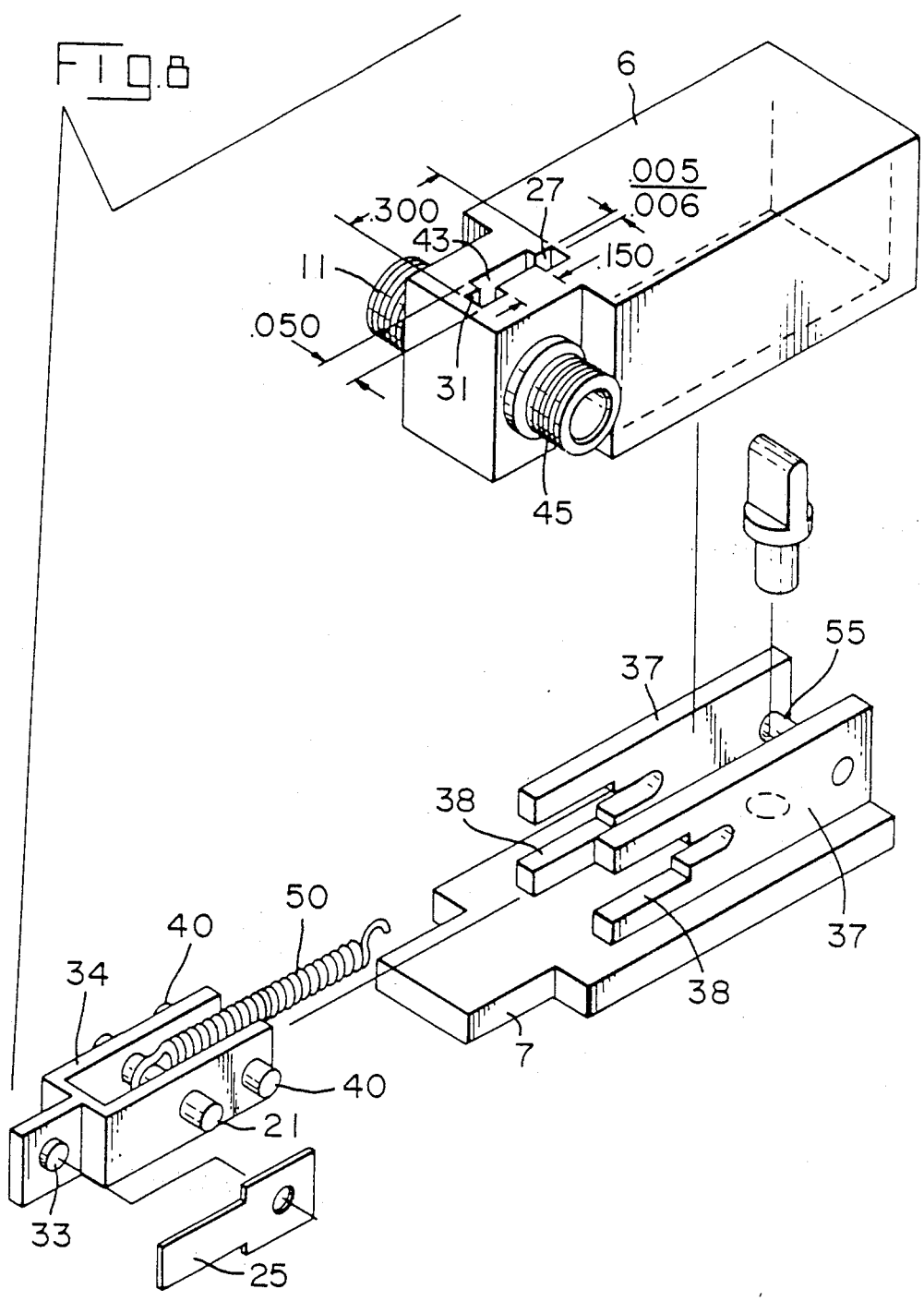

FIBER OPTIC CABLE CONNECTOR WITH SNAP-ACTION SHUTTER

FIELD OF THE INVENTION

This invention relates to optical fiber connectors and more particularly to such connectors which include a mechanism for controllably shuttering the light passing through an end of an optical fiber that is connected at the connector.

BACKGROUND OF THE INVENTION

Cables including optical fibers are well known. Such cables are used, for example, to provide an intermittent optical control signal from a source of light. Frequently, a snap-action shutter possessing a controlled intermittence is used to obstruct controllably the passage of light.

Shutter construction typically is expensive requiring precision machining of piece parts and highly controlled shutter mechanisms. The reduction of shutter cost and an inexpensive shutter movement are the problems to which the present invention is addressed.

BRIEF DESCRIPTION OF ILLUSTRATIVE EMBODIMENTS OF THE INVENTION

A snap-action, shuttered, optical fiber connector in accordance with the present invention comprises a first arm of a lever that pivots about a fulcrum from a position obstructing light between two optical fibers which are closely spaced from one another. The first arm extends into an arm holder which defines the path of movement for the arm. The holder is relatively large in size and yet allows close spacing of the fibers and precise control over transverse (to the light path) movement of the first arm to ensure substantially complete obstruction of the light path. The arm holder advantageously is moldable of plastic or amenable to electro-discharge machining of metal material.

In one embodiment, the lever arm (the shutter) is of a material to obstruct light of all wavelengths. In another embodiment, the lever arm is made of a material which obstructs light of only one or a limited range of wavelengths. The latter embodiment is particularly useful for light multiplexing, a function which can be more fully exploited by two or more shutters adapted to obstruct light of different wavelengths or different limited ranges of wavelengths.

A second arm of the lever is spring loaded, by a spring, to provide for a simple and inexpensive snap-action motion between the obstruction position and a non-obstructing position for the first arm of the lever. The second arm includes a pin in a position corresponding to the fulcrum of the lever. A spring is connected at one end to the pin and at the other end to a second pin also essentially aligned with the axis of the lever but spaced apart from the fulcrum and connected to an actuator. The spring is responsive to the position of the actuator which is mechanically movable transverse to the lever axis such that the second pin is constrained to occupy one of two possible positions. This action, in turn, dictates one of two possible positions for the first lever arm via the spring. The lever arm can be made quite thin to permit close spacing of the fiber cables. Highly controlled movement of the first lever arm is achieved by the guide action of the holder.

BRIEF DESCRIPTION OF THE DRAWINGS

FIGS. 4, 5, and 8 are projection views partially in cross section, of an alternative embodiment of this invention;

DETAILED DESCRIPTION

Figure 1:
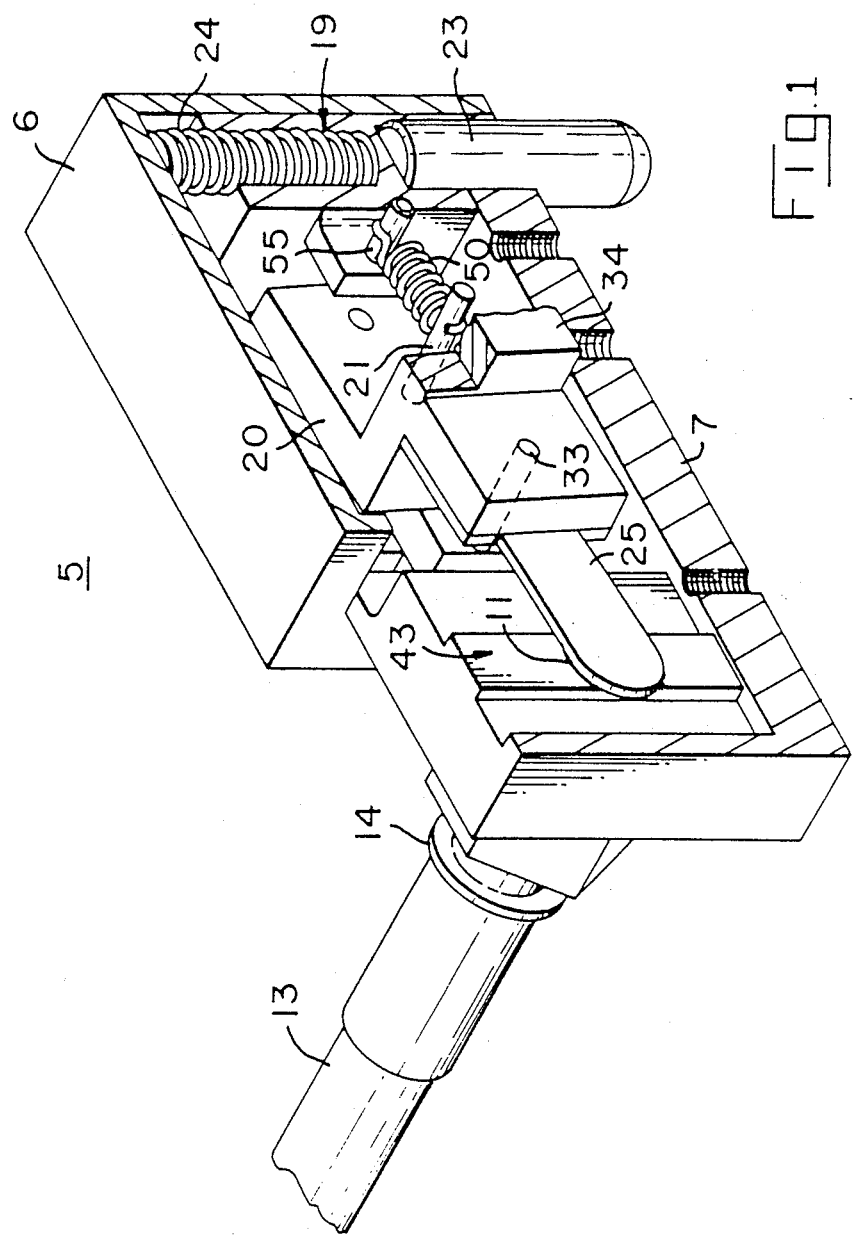
FIG. 1 is a projection view, partially in cross section, showing a fiber bundle and a snap-action connector in accordance with one embodiment of this invention.

FIG. 1 shows a portion of an optical fiber connector 5 operative as a switch. The connector includes an inverted receptacle or housing 6, assembled over a base 7. The housing is shown cut in half to expose a first transverse tunnel 11. Tunnel 11 is adapted to receive a first optical fiber cable. The optical fiber cable is designated 13 and is shown terminating in the familiar optical alignment bushing 14 for communicating with tunnel 11. The bushing 14 is described in detail in U.S. Pat. No. 4,440,469.

The base is adapted as a platform for an actuator plunger 19 and a lever 20 as will be discussed more fully hereinafter. Lever 20 pivots about a fulcrum defines by pins 40, 40 projecting from the lever 20. The actuator and the lever are connected by an extension coil spring 50 that is connected to pin 21. The extension spring imposes a snap-action operation on the lever in response to the movement of actuator 19.

The snap-action operation manifests itself in the movement of anterior arm 25 of lever 20. The anterior arm defines the shutter of the switch. The snap-action operation can be seen to be provided by a simple and inexpensive spring mechanism.

The precise movement of the shutter (25) is guided by the constraints imposed on the shutter movement by the shape of housing 6 and the manner in which the shutter and the cover communicate with one another. Specifically, the shutter (anterior arm 25) extends across internally threaded tunnel 11, and is slidably received in a slot 27 in housing 6.

Figure 2:
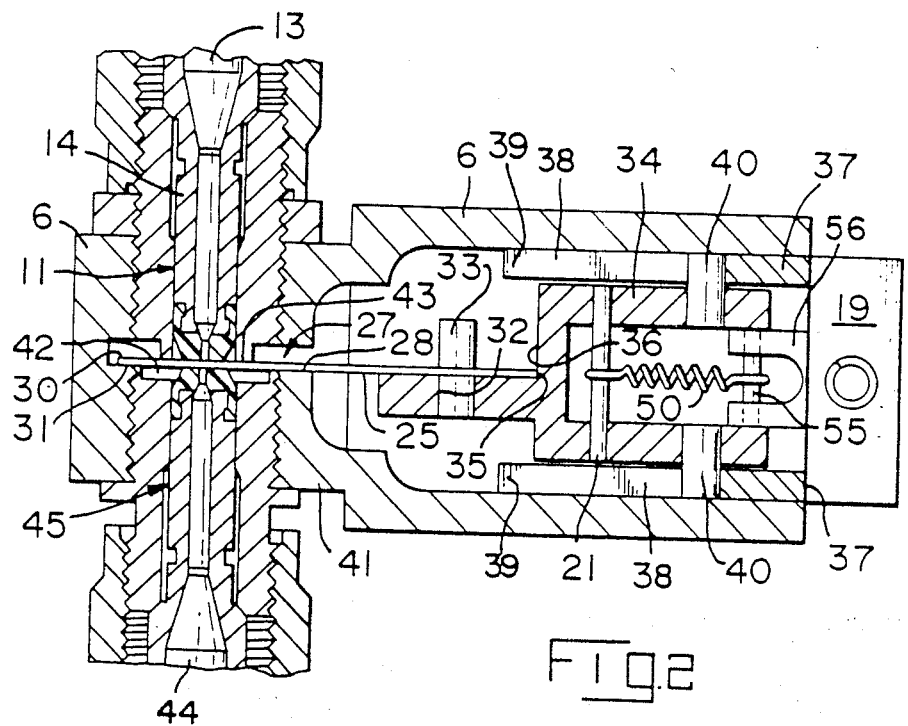
FIGS. 2, 3, and 3A are cross section and schematic views of portions of the connector of FIG. 1.

The constraints imposed by the slot 27 on the shutter 25 are best seen in the cross-sectional view of FIG. 2. Tip 30 of the shutter can be seen to be confined in slot segment 31. Moreover cable 13 and a second cable 44 can be seen to be separated by essentially on the thickness of the shutter (typically 0.005 to 0.006 inch). The portion of housing 6 (designated 41 in FIG. 2) includes a slot segment 42 having a wall or mesa 43 and a slot segment 28. The housing 6 is adapted to retain an end of optical fiber cable 44 in a closely-spaced and coincident alignment with respect to the end of cable 13. To this end, portion 41 includes a second internally threaded tunnel 45 communicating with slot segment 42 and into which cable 44 is threadably inserted as is clear from FIG. 2.

Slot segments 28, 42 and 31 have walls that impinge against opposite sides of the shutter 25 and serve to guide the shutter as well as confine the shutter in a narrow space between cable 44 in close proximity to the opposing fiber cable 13. The slot segments 28, 42 and 31 are serial, communicating and offset laterally with respect to one another. Further they are relatively wide for ease in machining and free of complexity in mechanism or tolerances. Yet precise shutter movement and constraint is realized because of the above described design of the slot 27. The shutter 25 is a thin blade, having an opening 32 that mounts over a pin 33 that is anchored to and projects from a carriage 34. The end edge 35 of the shutter 25 abuts wall 36 of the carriage 34 to resist rotation about the pin 33. The shutter 25 is readily assembled to the pin and is constrained only by the slot segments 28, 42 and 31. The carriage 34 is slidably mounted and suspended between a pair of side walls 37, 37 that are secured to and project from the platform 7. Respective closed end slots 38, 38 in the walls 37, 37 have open ends 39, 39 and receive respective pins 40, 40 that are secured to and project from the carriage 34. The pins 40, 40 suspend carriage 34 and are slidably constrained for movement along respective slots 38, 38. The pin 21 projects from the carriage and is received in the slots 38, 38 and is constrained for movement therein.

Figure 3:
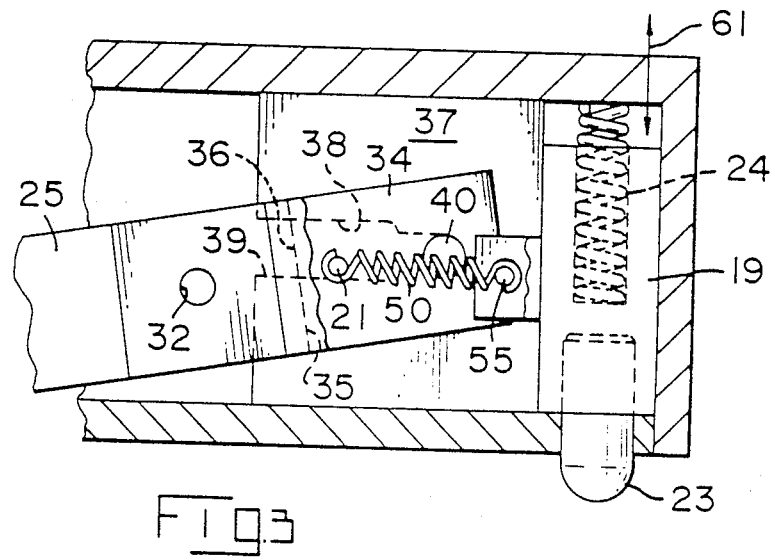
Figure 3A:
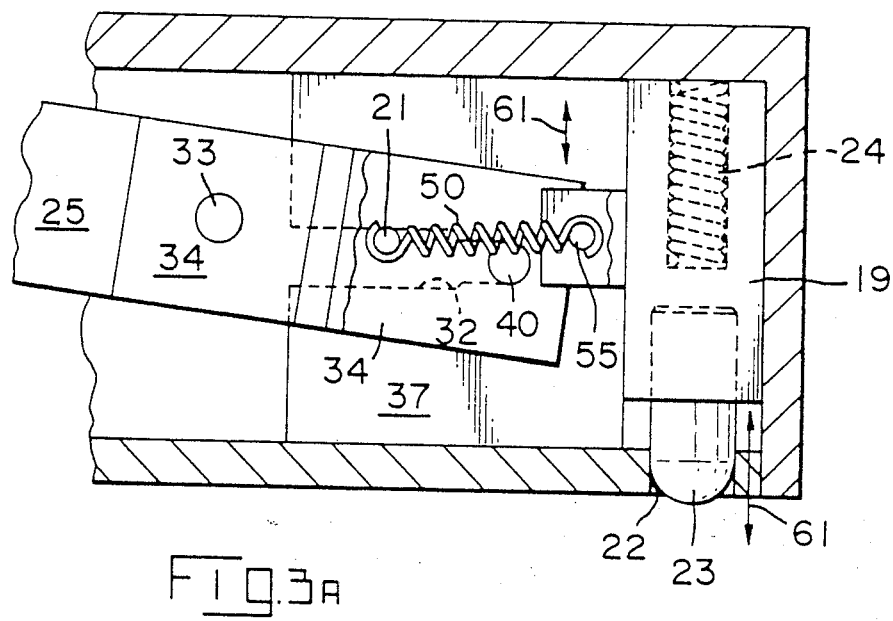

FIGS. 3 and 3A illustrate schematically the snap-action mechanism. The end of the spring 50 is connected to pin 55 which is secured in a yoke 56 of actuator plunger 19. As shown in FIGS. 3 and 3A, the actuator plunger 19 slidably engages the walls 37, 37. The spring 50 under tension maintains the plunger 19 slidably against walls 37, 37. The spring 50 maintains pin 40 pivotally seated in the closed ends of slots 38, 38. The plunger 19 includes an actuator finger 23 projecting through opening 22 in platform 7, and a coil spring 24 engaging housing 6 and spring biasing the plunger 19 in a direction shown by double headed arrow 61 to a first position engaging the platform 7, as shown in FIG. 3. Tension of spring 50 will bias pin 21 to engage and stop against respective walls of the slots 38, 38, and pivot the blade 25 to interpose between tunnels 11 and 45.

Applying an axial force on finger 23 to compress the spring 24, will cause the plunger 19 to move slidably from its first position to a second position shown in FIG. 3A. Tension on spring 50 will cause shutter 25 to pivot about pin 40 as a fulcrum until pin 21 is biased by spring 50 to engage and stop against respective walls of the slots 38, 38, thereby to remove blade 25 from tunnels 11 and 45 and allow optical communication between the cables 13 and 40 in the tunnels. Movement of the blade 25 is accomplished with a snap action to provide quickly shuttered intermittent communication.

Figure 4:
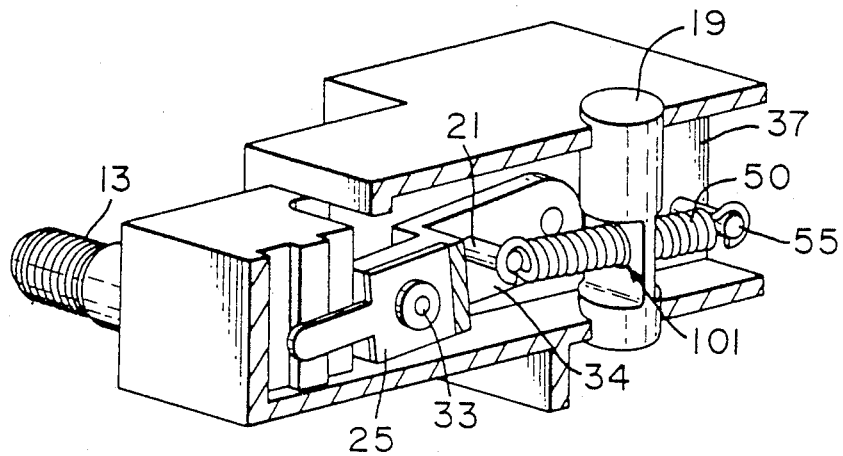
Figure 5:
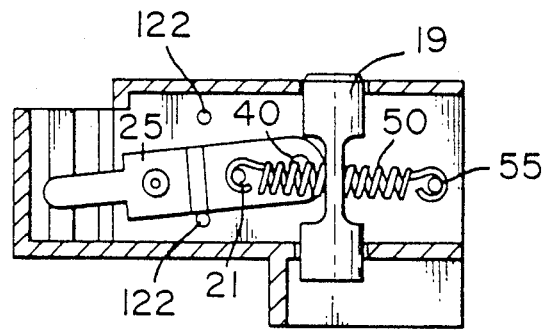

In the embodiment of FIG. 4, actuator plunger 19 includes a tunnel 101 and slidably migrate through spring 50. Spring 50 extends between the pin 21 at one end and through tunnel 101 and pin 55 at the other end. The plunger 19 engages the spring 50 intermediate its ends and serves to bend the spring to elongate the spring in a desired direction and effect the desired snap action. Pin 55 in this embodiment is secured in the walls 37, 37, whereas in FIG. 1, the pin 55 is secured in the yoke of actuator plunger 19. There are two pins 122, 122 in FIG. 5, providing stops for the pivotal movement of the blade 25. FIG. 5 illustrates the snap-action quite well. The blade 25 rotates about the fulcrum which is represented by pin 40. When the axis of blade 25 is in alignment with the axis of the spring 50, the spring is fully extended under tension. When the axis of the blade is misaligned with the axis of the spring, the spring quickly shortens under its own spring tension thereby snaping blade 25 into one of two positions with the axis of blade 25 tilted (see FIG. 3 or FIG. 3A) with respect to that of spring 50 as viewed in FIG. 5. FIG. 5 and FIG. 3 show the blade in the same position.

FIG. 5 shows a graph of force in pounds versus the position of actuator plunger 19 in either of the embodiments of FIG. 1 or 4. The actuator position is shown in increments of 0.001 inch. The actuator is moved between position limits of ±0.2 inch. At 0.040 inch, the force exerted by the actuator 19 on the spring 50 changes from 0.50 pound to 0.37 pounds abruptly as the actuator is moved from the −0.100 to the +0.100 position. During the return movement, when the actuator 19 moves from the +0.100 to the −0.100 position, an abrupt change in force on the spring 50 occurs at +0.20 inch, the force changing from 0.30 pounds to 0.42 pounds. The curves for the actuating and return excursions for the actuator 19 are designated 130 and 131, respectively, in FIG. 6.

Figure 6:
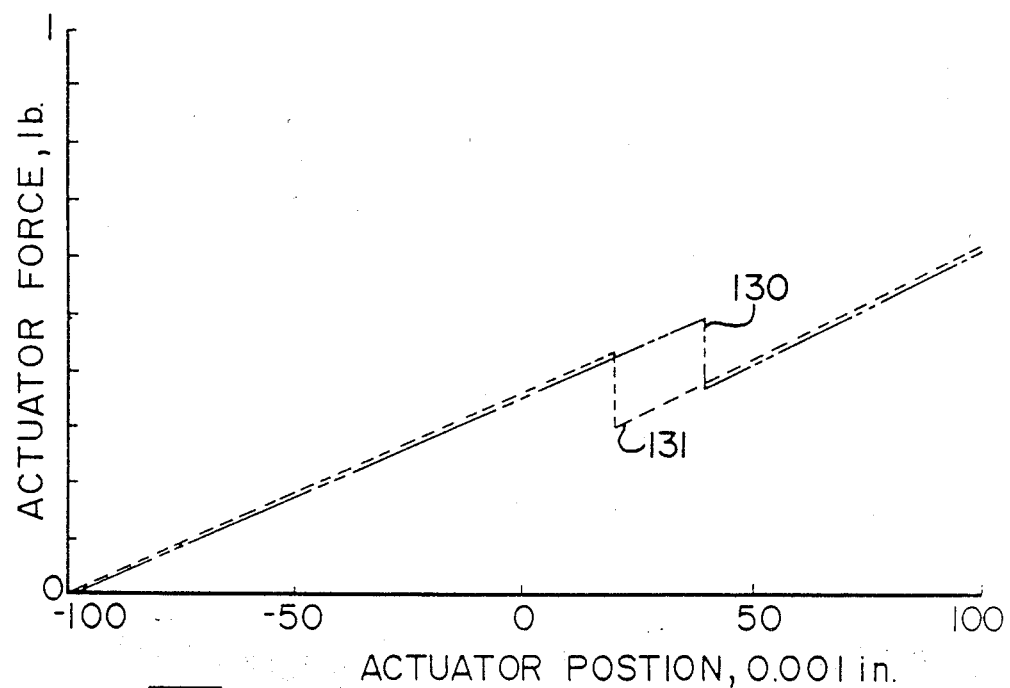
FIGS. 6 and 7 are graphs of force versus actuator (slider) position, and shutter position versus actuator position, respectively.
Figure 7:
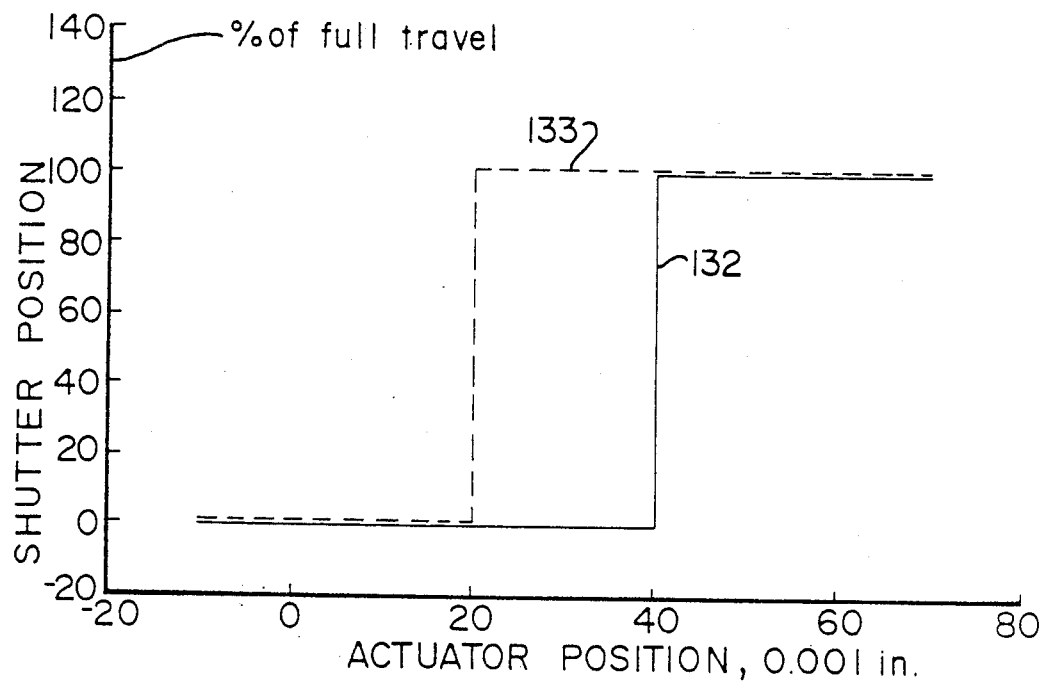

FIG. 7 shows the resulting positions of shutter 50 in response to the movement of the actuator 19 as discussed in connection with FIG. 6 in terms of percent of full travel. The actuating excursion is represented by solid curve 132; the return by broken curve 133. When the actuator 19 reaches the 0.040 inch position, the shutter 50 moves abruptly to its position of full travel. When the actuator 19 reaches the 0.020 inch position during the return excursion, the shutter 50 moves abruptly from its position of full travel to its opposite other position (zero). The actuator 19 can assume one of two steady state conditions, as can the shutter 50 as is clear from the figures.

FIG. 8 shows an embodiment constructed from a subassembly including a plurality of piece parts. The cover 6 for the switch is essentially the same as that in the embodiments of FIGS. 1 and 4. Two optical fiber cables (not shown) are connected at tunnels 11 and 45 much as was the case in the embodiment of FIG. 1. Slot segments 27, 31 and 43 correspond to slots 27, 31 and 43 of FIG. 2 respectively. The shutter 25 extends into the light path between the cables as was the case in the embodiment of FIG. 1. Actuator plunger 173 slidably mounts in opening 102 and engages the spring 50 intermediate its ends and serves to bend and elongate the spring 50 in a desired direction to effect the snap action.

FIG. 8 also shows the dimensions of the holder in the vicinity of the shutter. The spacing between the mesa and the through is 0.005 to 0.006 inch, whereas the spacing between the opposing positions of the holder elsewhere is 0.050 inch as shown. The mesa is 0.150 inch wide.

Figure 9:
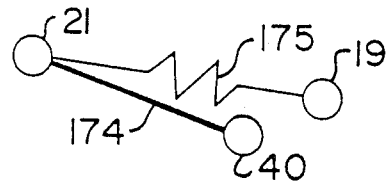
FIGS. 9, 10 and 11 are schematic illustrations of the positions for the extension spring of the connector of FIG. 1, 4, 5 or 8.
Figure 10:
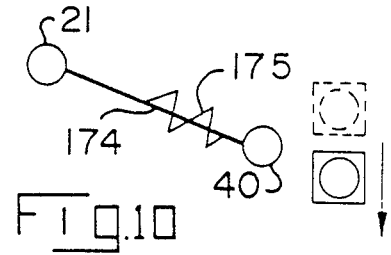
Figure 11:
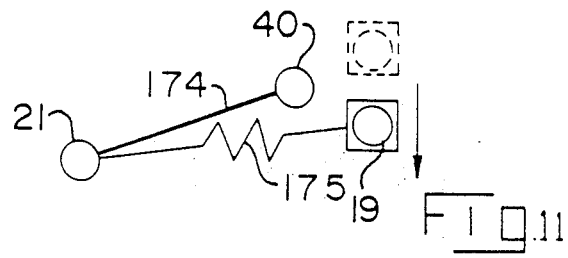

The embodiments of FIGS. 1, 4 and 8 provide the snap-action by an extension spring 50. FIGS. 9, 10 and 11 represent the extension spring 50 operation when the axis of the lever 174, representing the distance between fulcrum pin 40 and pin 21 of the carriage 34 is below, aligned with, and above the axis of the spring, respectively. The lever axis is designated 174 in FIGS. 9, 10 and 11. The spring axis is designated 175. It is clear that the tension on the spring is less when the two axes are misaligned.

Figure 12:
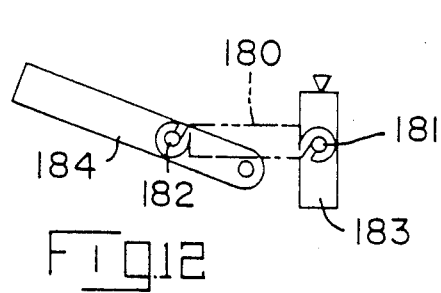
FIGS. 12, 13, 14, 15, 19, 20, and 21 are schematic illustrations of alternative spring biasing arrangements for linking the actuator and lever arm of a connector of FIG. 1, 4, 5 or 8.
Figure 13:
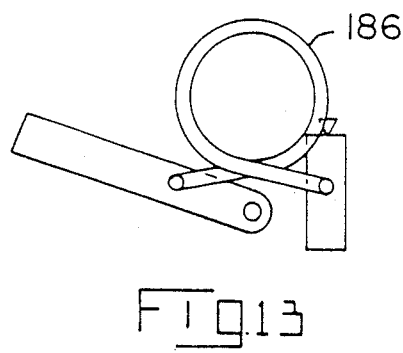
Figure 14:
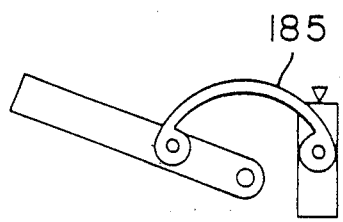
Figure 15:
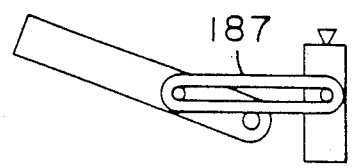

The tension required can be supplied by a variety of arrangements. FIG. 12 represents the extension spring 50 arrangements of the embodiments discussed above. The extension spring 50 is represented by a rectangle and is connected between pins 21 and 55. The extension spring is shown replaced by a torsion spring 185 in FIG. 13, an arched spring 186 in FIG. 14, and an elastic band 187 in FIG. 15.

Figure 16:
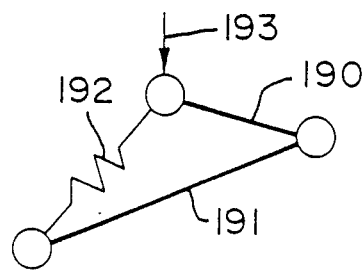
FIGS. 16, 17 and 18 are schematic illustrations of the compression action of the spring biasing arrangement linking the actuator and the lever arm of the connector of FIG. 1, 4, 5 or 8.
Figure 17:
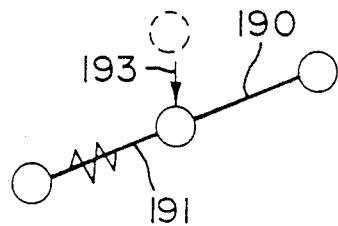
Figure 18:
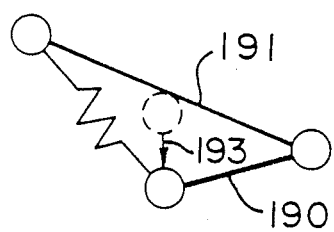

Alternatively, a compression link can be provided. FIGS. 16, 17 and 18 illustrate the compression mode of operation. The actuator is operative on offset arm 190; the shutter is represented by line 191. Arm 190 is affixed to the shutter at a predetermined angle as shown. The compression spring is represented by line 192. The force of the actuator is represented by arrow 193. In FIG. 16 as downward force of the actuator forces arm 190 and thus shutter 191 into a downward misaligned position shown. When the shutter 191 and the actuator axes are aligned as shown in FIG. 17, the compressive force on the spring is increased over that present in the relationship represented in FIG. 16. FIG. 18 represents the opposite steady state position where the shutter axis is above that of the actuator and the compressive force on the spring also is less than that which occurs in the aligned situation as represented in FIG. 17.

Figure 19:
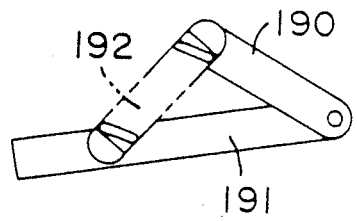
Figure 20:
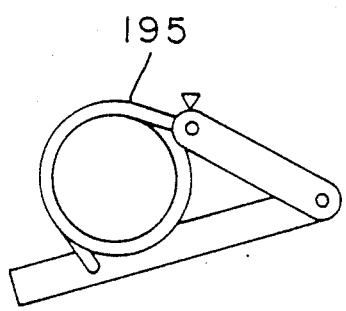
Figure 21:
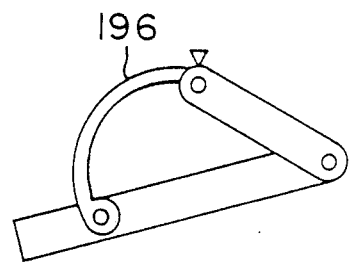

FIGS. 19, 20 and 21 represent various arrangements for implementing a compression link. FIG. 19 represents the compression spring embodiment where the spring 192 is secured between arm 190 and shutter 191. FIG. 20 represents the case where a torsion spring 195 replaces compression spring 192. FIG. 21 represents the case where an arched spring 196 replaces the compression spring.

It is clear that the requisite snap-action movement can be achieved in a variety of ways.

The shutter 25 may comprise a material which is opaque acting to obstruct the passage of light of all wavelengths. On the other hand, the shutter 25 may comprise a material which obstructs light of a selected wavelength or range of wavelengths. Such materials are well known and may, for example, comprise dye-colored plastics for obstructing light in a range of wavelengths from 600 to 700 nanometers.

It is important to emphasize that a precise snap-action optical switch is provided with simple piece parts manufactured with relaxed tolerances and by inexpensive and mass production means. It is also important to emphasize that the assembly technique is simple and inexpensive. This is particularly clear in the embodiment of FIG. 8 where the entire shutter and snap-action subassembly comprising parts 25, 34, 50, 7, 37, 55 and 173 can be preassembled and inserted within cover 6 in a simple assembly procedure adapted for mass production. The embodiment of FIG. 1 also is adapted for assembly in this manner where the shutter and snap-action mechanisms are assembled on base 7 for insertion in cover 6. In either embodiment, the subassembly is entirely stable before insertion.

The embodiments of FIGS. 1, 4 or 8 can be adapted for a normally occluded or normally transmissive switch. The selection is dictated by the position of the tunnel (i.e., 11 of FIG. 1). In one selected position, the tunnel 11 aligns with the normal position (FIG. 3) of the shutter 25. In an alternative selected position, the tunnel 11 is misaligned with the normal position. FIGS. 1 and 3 show the tunnel 11 and the shutter 25 aligned.

It is to be noted that the housings of the several embodiments can be adapted to accept cable couplings of different configurations without modification of the shutter and snap-action mechanism.

What is claimed is:

1. A switch for interrupting a light transmitting path, comprising: a housing, a light transmitting path extending in the housing, an elongated blade mounted in the housing and having a relatively thin portion, a blade receiving slot in the housing and extending transversely of the light transmitting path and receiving the thin portion, means in the housing for moving the thin portion alternately into and out of the light transmitting path, and wherein, the slot is constructed of serially arranged slot segments communicating with one another, and wherein said slot segments are alternate offset with respect to one another and have at least three corresponding alternate offset walls impinging on corresponding opposite sides of the thin portion to guide and support the thin portion.

2. A switch as recited in claim 1, wherein, said means comprises a pivot for pivotally mounting the blade, an actuator mounted to said housing for reciprocation, and an extensible member extending from the actuator to a location on the blade between the pivot and the thin portion, and the extensible member being engaged by the actuator for reciprocation therewith to pivot said blade reciprocatably about said pivot.

3. A switch as recited in claim 2, wherein, said extensible member is a spring.

4. A switch as recited in claim 2, wherein, said extensible member is an elastic band.

5. A switch as recited in claim 2, wherein, said extensible member is in tension during reciprocation.

6. A switch as recited in claim 2, wherein, said extensible member is in compression during reciprocation.

7. A switch as recited in claim 2, wherein, said extensible member passes through said actuator and is connected to the housing.

8. A switch as recited in claim 2, wherein, said actuator is a plunger and a spring engaging the plunger, and the spring is alternately compressed and expanded upon reciprocation of said plunger.

9. A switch as recited in claim 2, wherein, said actuator is a plunger, and said extensible member is a spring passing through said plunger and connected to the housing.

* * * * *